United States Patent
Hirakawa

Patent Number: 5,546,232
Date of Patent: Aug. 13, 1996

[54] TWO-GROUP ZOOM LENS

[75] Inventor: Jun Hirakawa, Tokyo, Japan

[73] Assignee: Asahi Kogaku Kogyo Kabushiki Kaisha, Tokyo, Japan

[21] Appl. No.: 258,992

[22] Filed: Jun. 13, 1994

[30] Foreign Application Priority Data

Jun. 14, 1993 [JP] Japan ................... 5-141961

[51] Int. Cl.$^6$ .................................................. G02B 15/14
[52] U.S. Cl. ......................................................... 359/691
[58] Field of Search ........................... 359/691, 676, 359/680, 681, 682, 793

[56] References Cited

U.S. PATENT DOCUMENTS

| 4,074,931 | 2/1978  | Okudaira ............. | 350/184 |
| 4,653,876 | 3/1987  | Yamagata ............ | 350/463 |
| 4,792,215 | 12/1988 | Sato .................... | 350/426 |
| 4,812,022 | 3/1989  | Sato .................... | 350/426 |
| 4,934,797 | 6/1990  | Hirakawa ............. | 350/432 |
| 5,076,677 | 12/1991 | Sato .................... | 359/680 |
| 5,155,629 | 10/1992 | Ito et al. .............. | 359/676 |
| 5,233,474 | 8/1993  | Hirakawa ............. | 359/717 |
| 5,270,863 | 12/1993 | Uzawa ................. | 359/682 |
| 5,278,699 | 1/1994  | Ito et al. .............. | 359/692 |

FOREIGN PATENT DOCUMENTS

| 59-142515 | 8/1984 | Japan. |
| 1185607   | 7/1989 | Japan. |
| 1239516   | 9/1989 | Japan. |
| 2167515   | 6/1990 | Japan. |
| 4114115   | 4/1992 | Japan. |
| 4261511   | 9/1992 | Japan. |

*Primary Examiner*—Georgia Y. Epps
*Assistant Examiner*—Dawn-Marie Bey
*Attorney, Agent, or Firm*—Greenblum & Bernstein P.L.C.

[57] ABSTRACT

A two-group zoom lens is provided which has a first lens group of negative power and a second lens group of positive power, located in this order from an object to be photographed. The first and second lens groups are moved relative to one another to provide various degrees of magnification. The first lens group includes a first lens of negative power, a second lens of negative power, and a third lens of positive power. The second lens group includes a fourth lens of positive power, a fifth lens of positive power, a sixth lens of negative power, and a seventh lens of positive power. The fifth lens is cemented to the sixth lens. The fifth and sixth lenses satisfy the following conditions: (a) $0.1 < n_N - n_P < 0.4$; (b) $-1.3 < r_c/f_2 < -0.5$; and (c) $0.6 < d_{1-2}/f_w < 1.2$; wherein, $n_P$ represents a refractive index of the fifth lens, $n_N$ represents a refractive index of the sixth lens, $r_c$ represents a radius of curvature of the cementing surface of the fifth and sixth lenses, $f_2$ represents a focal length of the second lens group, $d_{1-2}$ represents a distance between the first and second lens groups, and $f_w$ represents a focal length of the entire zoom lens at a wide angle extremity.

8 Claims, 6 Drawing Sheets

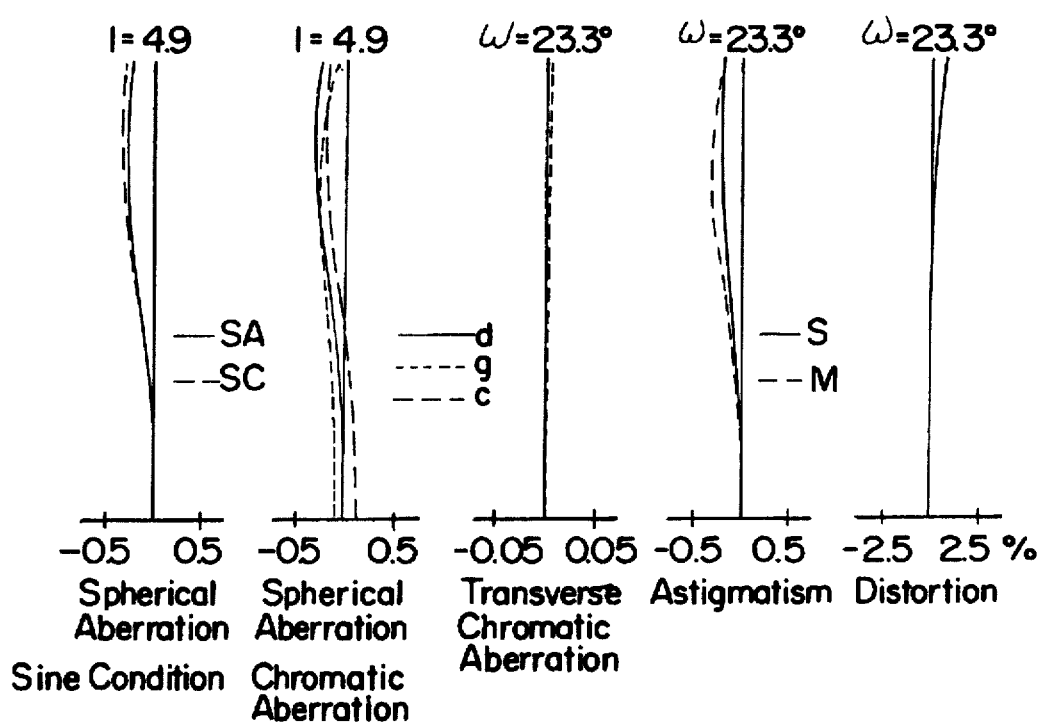
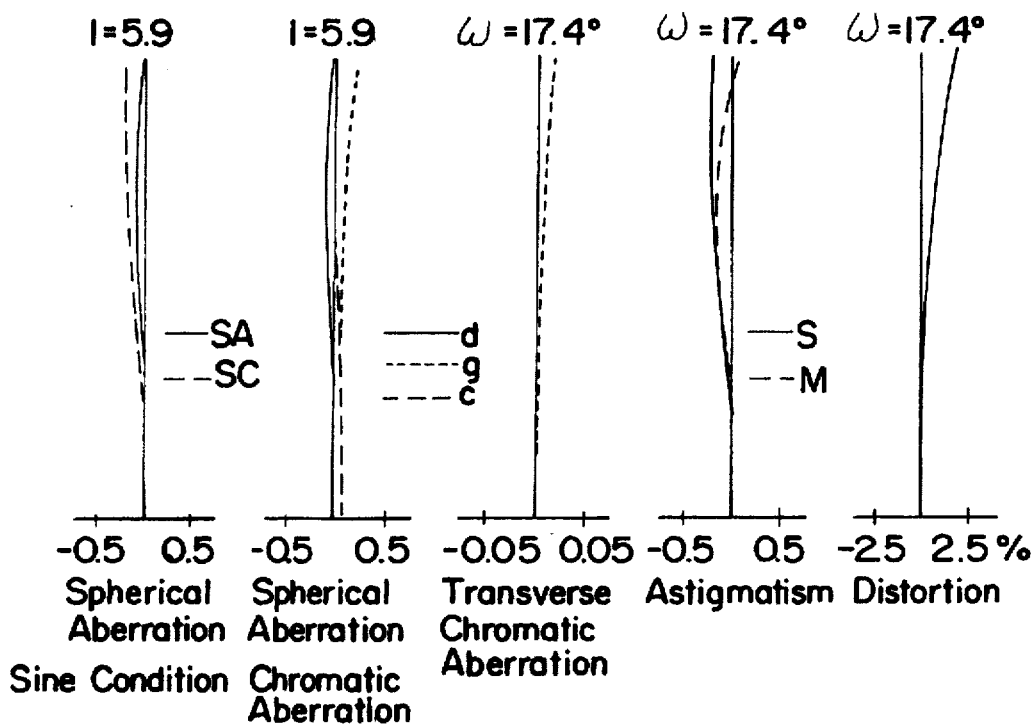

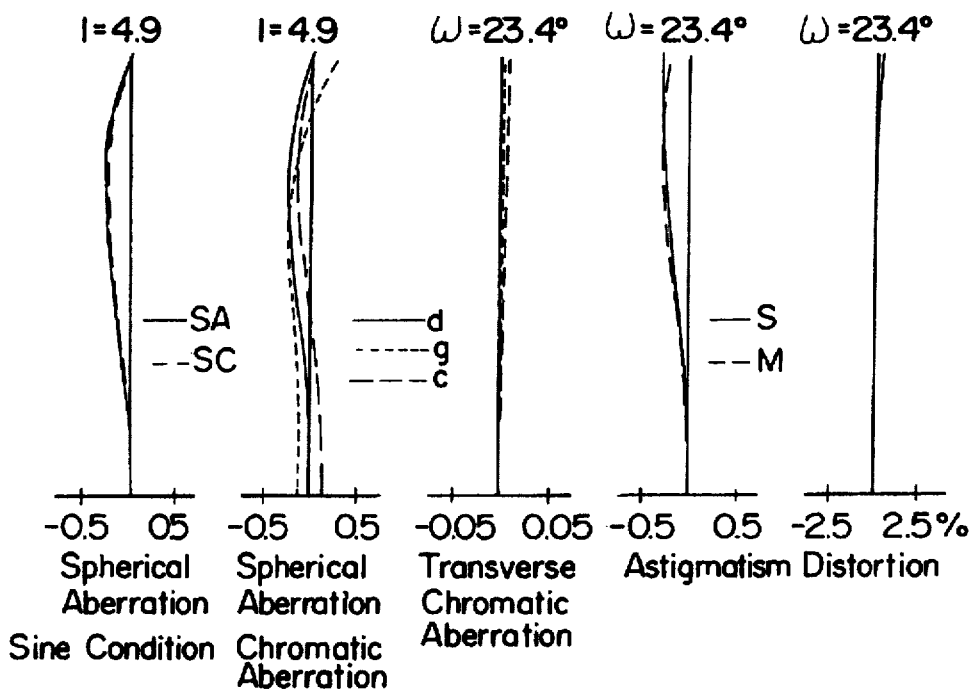
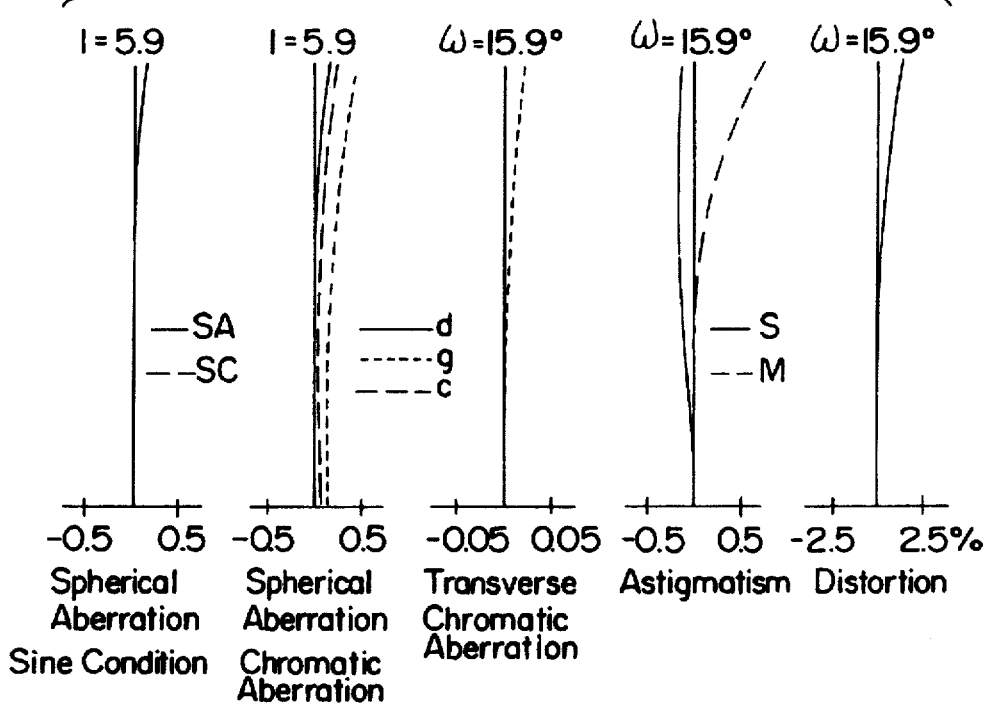

the cemented lens assembly as a whole has positive power.

TWO-GROUP ZOOM LENS

BACKGROUND OF THE INVENTION

1. Field of the Invention

The present invention relates to a zoom lens with two lens groups (referred to as a two-group zoom lens) of standard focal length range having a magnification of approximately two, used with, for example, a single lens reflex camera.

2. Description of Related Art

A conventional two-group zoom lens of standard focal length range having a magnification of approximately two usually includes a positive and negative lens groups, as disclosed in, for example, Japanese Unexamined Patent Publication Nos. SHO 59-142515, 1-185607, HEI 1-239516 or HEI 4-114115, etc.

SUMMARY OF THE INVENTION

It is an object of the present invention to provide a less expensive and more compact two-group zoom lens than conventional two-group zoom lenses hitherto known. To achieve the object mentioned above, according to an aspect of the present invention, a two-group zoom lens is provided which has a first lens group of negative power and a second lens group of positive power, located in this order from an object to be photographed. The first and second lens groups are moved relative to one another to provide various degrees of magnification. The first lens group includes a first lens of negative power, a second lens of negative power, and a third lens of positive power. The second lens group includes a fourth lens of positive power, a fifth lens of positive power, a sixth lens of negative power, and a seventh lens of positive power. The fifth lens is cemented to the sixth lens. The fifth and sixth lenses satisfy the following conditions: (a) $0.1 < n_N - n_P < 0.4$; (b) $-1.3 < r_c/f_2 < -0.5$; and (c) $0.6 < d_{1-2}/f_w < 1.2$; wherein, $n_p$ represents a refractive index of the fifth lens, $n_N$ represents a refractive index of the sixth lens, $r_c$ represents a radius of curvature of the cementing surface of the fifth and sixth lenses, $f_2$ represents a focal length of the second lens group, $d_{1-2}$ represents a distance between the first and second lens groups, and $f_w$ represents a focal length of the entire zoom lens at a wide angle extremity.

According to another aspect of the present invention, a two-group zoom lens is provided which has a first lens group of negative power and a second lens group of positive power, located in this order from an object to be photographed. The first and second lens groups are moved relative to one another to provide various degrees of magnification. The first lens group includes a first meniscus lens of negative power having a convex surface on a side of the first meniscus lens nearer the object, a second meniscus lens of negative power having a convex surface on a side of the second meniscus lens nearer an object image surface, and a third meniscus lens of positive power having a convex surface on a side of the third meniscus lens nearer the object. The zoom lens satisfies the following relationship: (d) $0 < f_1/r_{2-2} < 1.2$; wherein, $f_1$ represents a focal length of the first lens group, and $r_{2-2}$ represents a radius of curvature of the second lens surface of the second meniscus lens.

The present disclosure relates to subject matter contained in Japanese patent application No. HEI 5-141961 (filed on Jun. 14, 1993) which is expressly incorporated herein by reference in its entirety.

BRIEF DESCRIPTION OF THE DRAWINGS

The invention will be described below in detail with reference to the accompanying drawings, in which;

FIG. 3 shows various aberration diagrams of the two-group zoom lens, as shown in FIG. 1, at an intermediate focal length;

FIG. 4 shows various aberration diagrams of the two-group zoom lens, as shown in FIG. 1, at a telephoto extremity;

FIG. 11 shows various aberration diagrams of the two-group zoom lens, as shown in FIG. 9, at an intermediate focal length; and, FIG. 12 shows various aberration diagrams of the two-group zoom lens, as shown in FIG. 9, at a telephoto extremity.

DESCRIPTION OF THE PREFERRED EMBODIMENT

Figure 1:
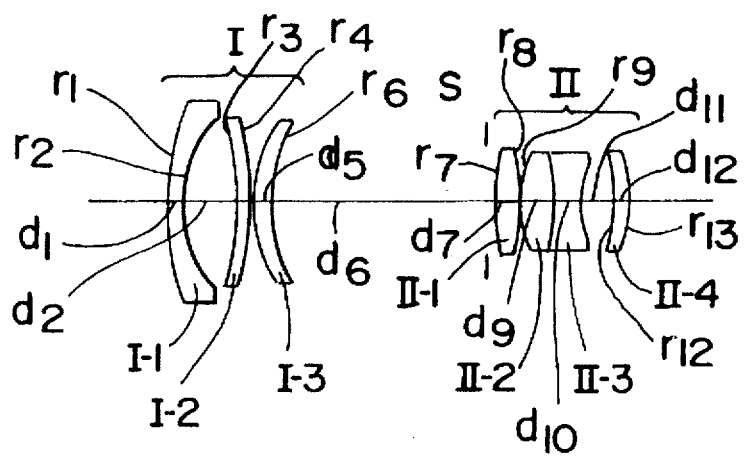
FIG. 1 is a schematic view of a lens arrangement of a two-group zoom lens at a wide-angle extremity, according to a first embodiment of the present invention.

A two-group zoom lens, according to the present invention, includes a first lens group I having three lenses (i.e., first, second and third lenses I-1, I-2 and I-3B), and a second lens group II having four lenses (i.e., fourth, fifth, sixth and seventh lenses II-1, II-2, II-3 and II-4), with II-2 and II-3 being cemented to each other.

Lenses II-2 and II-3 satisfy the requirements represented by the formulas (a) and (b) below.

$$0.1 < n_N - n_P < 0.4 \tag{a}$$

wherein "$n_p$" designates the refractive index of lens II-2, and "$n_N$" the refractive index of the sixth lens II-3.

$$-1.3 < r_c/f_2 < -0.5 \tag{b}$$

wherein "$r_c$" designates the radius of curvature of the cementing surface of lenses II-2 and II-3 and "$f_2$" the focal length of the second lens group II, respectively.

In the second lens group II, lenses II-2 and II-3 which constitute a cemented lens assembly have positive power and negative power, respectively. In the present invention, the powers of lenses 5 and 6 are preferably intensified not only to make the lens assembly small, but also to enhance an aberration correction function. Moreover, due to the adhesion of lenses II-2 and II-3, the lens assembly is minimally influenced by possible manufacturing errors, resulting in a stable and high productivity of the lens assembly with a low manufacturing cost.

The formula (a) specifies a difference in the refractive index between lenses II-2 and II-3. If lenses II-2 and II-3 are made of materials which do not satisfy the requirement represented by the formula (a), i.e., if the refractive index difference is smaller than the lower limit (i.e., n=0.1), spherical aberration cannot be effectively corrected at the cemented surface of II-2 and II-3. This leads to an increase in the coma. Conversely, if the refractive index difference is larger than the upper limit (i.e., n=0.4), the refractive index $n_p$ of the positive lens II-2 becomes relatively small, and Petzval's sum increases. This makes it difficult to compensate the curvature of image (i.e., field curvature) and the astigmatism. In theory, the Petzval's sum can be decreased by increasing the refractive index $n_N$ of the negative lens II-3, but generally speaking, a lens material having a high refractive index is expensive. Accordingly, a solution to the problem in which the refractive index $n_N$ of the negative lens II-3 is increased is not practical from an economical view point.

Preferably, in the present invention, the lens II-1 is made of a lens material having a refractive index that is relatively high in order to correct the aberration. This also ensures that the lens II-2 can be made of a relatively inexpensive lens material having a relatively small refractive index.

The formula (b) specifies the radius of curvature of the cementing surface (i.e., mating surface) of lenses II-2 and II-3 to effectively correct the spherical aberration.

Since the cementing surface of the second lens group II is a diverging surface for correcting spherical aberration using the refractive index difference obtained by the formula (a), it is not desirable that the curvature of the cementing surface is smaller than the lower limit (i.e., −1.3). Conversely, if the curvature of the cementing surface is larger than the upper limit (i.e., −0.5), a high-order aberration may undesirably result.

The zooming range is defined by formula (c) below.

$$0.6 < d_{1\text{-}2}/f_w < 1.2 \tag{c}$$

wherein "$d_{1\text{-}2}$" designates the distance between the surface of terminal lens in the first lens group facing the image surface and a surface of the first lens in the second lens group facing the object side at the wide-angle extremity, and "$f_w$" the focal length of the entire lens system at the wide-angle extremity, respectively.

The wide-angle extremity is extended as the distance $d_{1\text{-}2}$ between the first and second lens groups I and II increases, but if the value of $d_{1\text{-}2}/f_w$ is larger than the upper limit (i.e, 1.2), the quantity of marginal ray tends to be undesirably reduced. Conversely, if the value of $d_{1\text{-}2}/f_w$ is smaller than the lower limit (i.e, 0.6), a large magnification cannot be obtained.

The following formula (d) defines shape of the lens I-2 of the first lens group I.

$$0 < f_1/r_{2\text{-}2} < 1.2 \tag{d}$$

wherein "$f_1$" designates the focal length of the first lens group I, and "$r_{2\text{-}2}$" the radius of curvature of the second surface of lens I-2, facing the image surface, respectively.

As is well known, if the power of the negative lens (i.e., front lens group) is increased to make a wide-angle lens or a zoom lens having an wide-angle compact at a wide-angle position, the distortion is increased. To prevent this, it is known to provide an additional weak positive lens on a lens nearest to an object to be photographed, for example, as disclosed in Japanese Unexamined Patent Publication Nos. HEI 4-114115, HEI 2-167515 or HEI 4-261511, etc. According to one of the most significant features of the present invention, the surface of the negative second lens that is located nearer an image of the object is a convex surface, instead of the provision of an additional positive lens. The convex lens surface functions to correct the distortion, similar to the additional positive lens. Consequently, in the present invention, a compact zoom lens which does not have an additional positive lens can be provided in which little or no distortion occurs.

If the degree of convexity of the lens surface of the second lens, as nearer the image surface is below the lower limit (i.e, 0) in the formula (d), distortion cannot be effectively corrected. Conversely, if the degree of convexity of the lens surface of the second lens nearer the image surface is above the upper limit (i.e., 1.2), the negative power of the second lens will be too weak to realize a wide-angle lens as a whole. In theory, it is possible to provide an enhanced concave surface on the surface of the second lens, as nearer the object to be photographed, to obtain a sufficient positive power of the second lens, but a coma will tend to occur.

First Embodiment:

FIG. 1 shows a lens arrangement of a two-group zoom lens at a wide-angle extremity, according to a first embodiment of the present invention.

As mentioned above, the first lens group I, located in front of a diaphragm S with respect to the object, comprises 1st, 2nd and 3rd lenses I-1, I-2, and I-3 whereas the second lens group II located behind the diaphragm S with respect to the object is comprises 4th, 5th, 6th and 7th lenses II-1, II-2, II-3, and I-4, respectively. The lenses of the first lens group I are all meniscus lenses, and lenses II-2 and II-3 of the second lens group II are cemented to each other.

Figure 2:
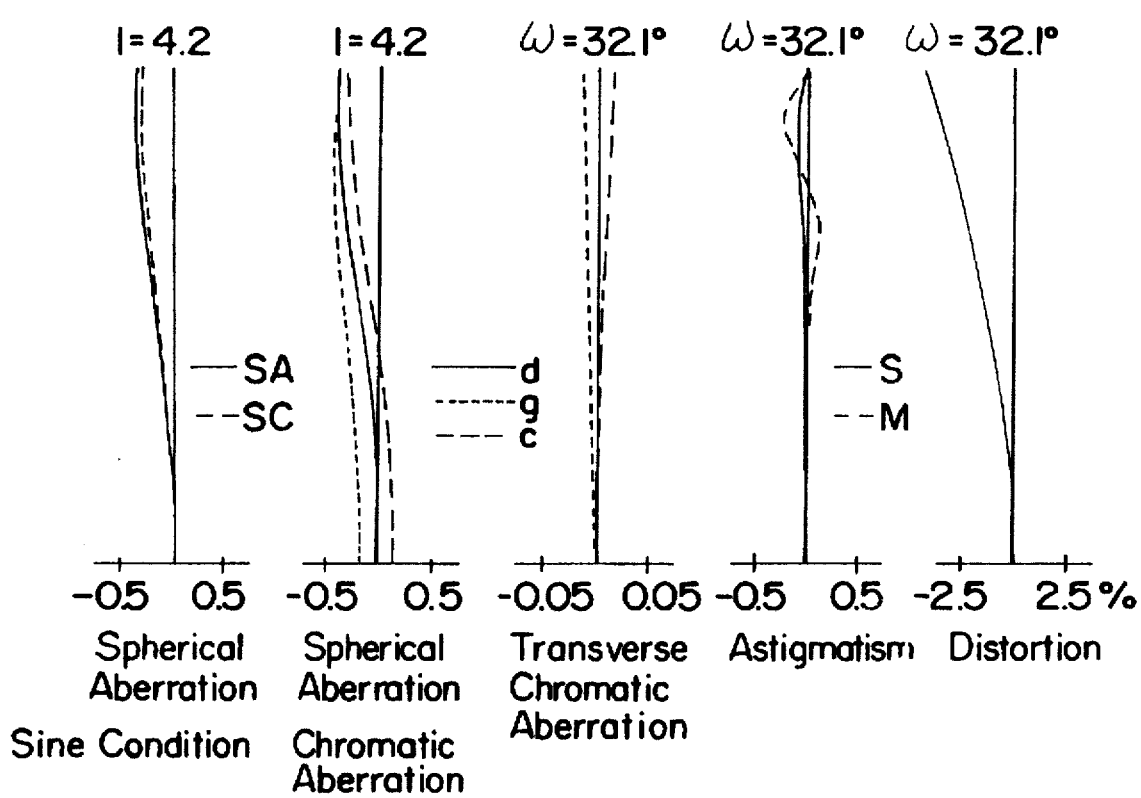
FIG. 2 shows various aberration diagrams of the two-group zoom lens, as shown in FIG. 1, at a wide-angle extremity.

Numerical data of the lens system shown in FIG. 1 is shown in Table 1 below. Diagrams of various aberrations thereof at the shortest focal length, intermediate focal length, and longest focal length extremity are shown in FIGS. 2, 3 and 4, respectively. In FIGS. 2 through 4, "SA" designates the spherical aberration and "SC" the sine condition. The "d-line", "g-line" and "C-line" represent the chromatic and transverse chromatic aberration, represented by the spherical aberration, at the respective wavelengths. The term "S" represents the sagittal ray, and the term "M" represents the meridional ray. In Table 1, "r" designates the radius of curvature of each lens surface, "d" the lens thickness or the distance between the lenses, "N" the refractive index, and "ν" the Abbe number, respectively.

TABLE 1

$F_{NO}$ = 1:4.2–4.9–5.9
f = 36.03–50.00–68.00
ω = 32.1°–23.3°–17.4°
$F_B$ = 41.41–50.42–62.04
$f_1$ = −54.610
$f_2$ = 35.238
$f_w$ = 36.03

| Surface No. | r | d | N | ν |
|---|---|---|---|---|
| 1 | 38.966 | 2.00 | 1.77250 | 49.6 |
| 2 | 17.670 | 7.08 | | |

TABLE 1-continued

| | | | | |
|---|---|---|---|---|
| 3 | −47.206 | 1.60 | 1.68250 | 44.7 |
| 4 | −61.564 | 0.50 | | |
| 5 | 21.018 | 2.54 | 1.80518 | 25.4 |
| 6 | 24.929 | 28.52–13.60–3.41 (variable) | | |
| stop | | 1.21 | | |
| 7 | 33.325 | 3.17 | 1.75500 | 52.3 |
| 8 | −66.840 | 0.10 | | |
| 9 | 14.913 | 4.59 | 1.50378 | 66.8 |
| 10 | −44.114 | 3.68 | 1.83400 | 37.2 |
| 11 | 13.983 | 4.36 | | |
| 12 | −40.374 | 2.31 | 1.58267 | 46.4 |
| 13 | −21.741 | | | |

Figure 5:
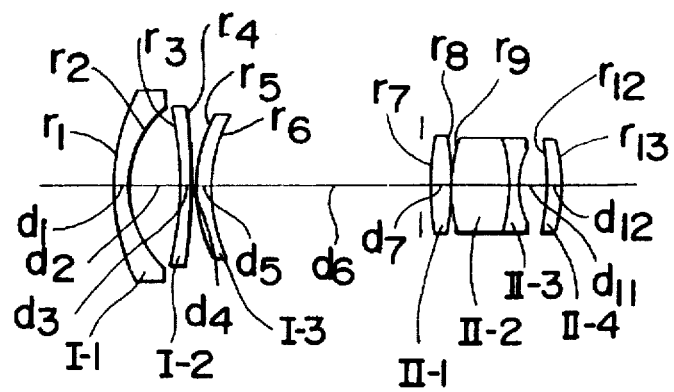
FIG. 5 is a schematic view of a lens arrangement of the two-group zoom lens at a wide-angle extremity, according to a second embodiment of the present invention.
Figure 6:
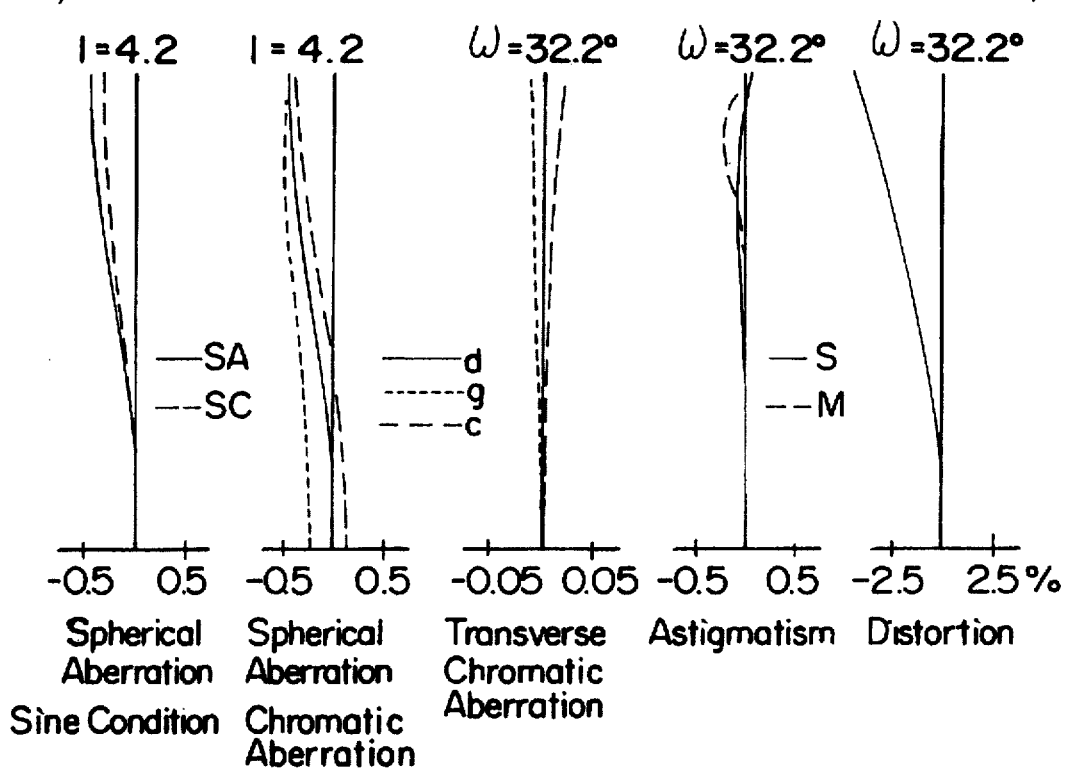
FIG. 6 shows various aberration diagrams of the two-group zoom lens, as shown in FIG. 5, at a wide-angle extremity.
Figure 7:
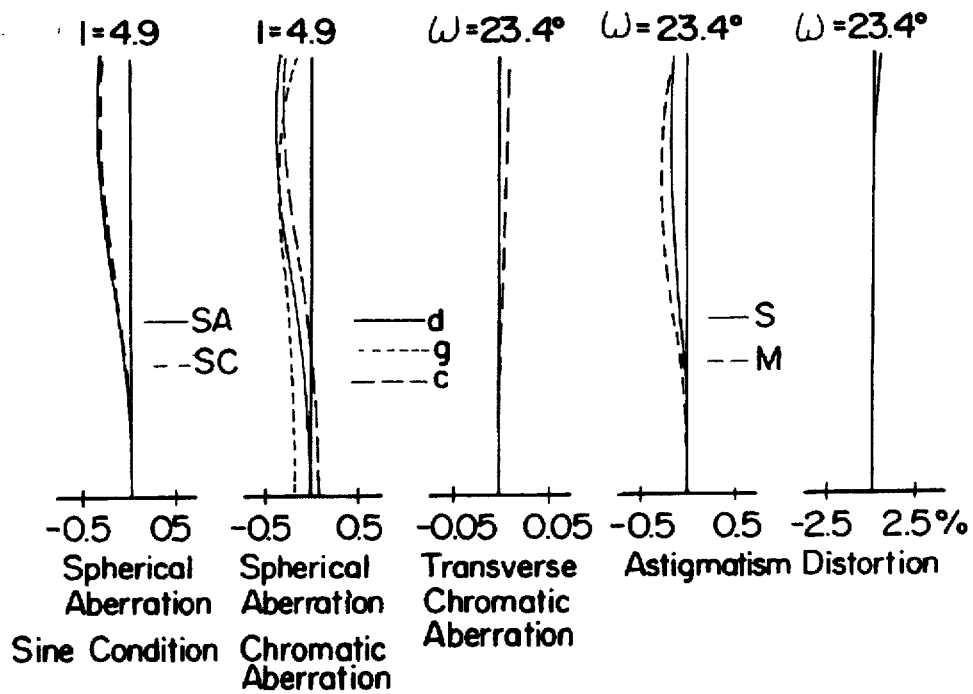
FIG. 7 shows various aberration diagrams of the two-group zoom lens, as shown in FIG. 5, at an intermediate focal length.
Figure 8:
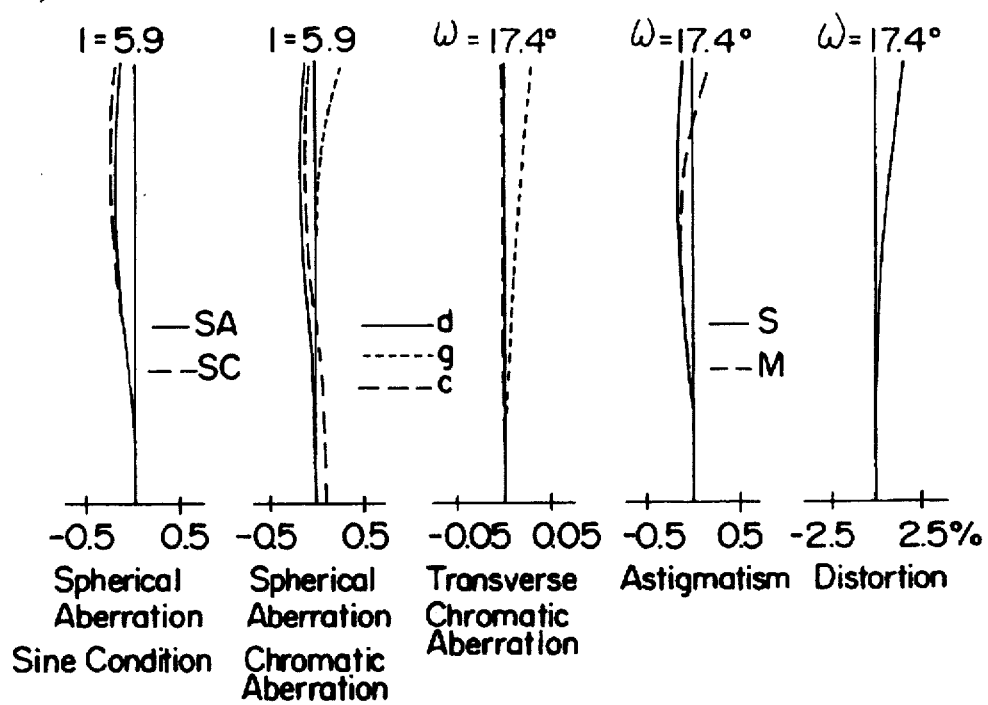
FIG. 8 shows various aberration diagrams of the two-group zoom lens, as shown in FIG. 5, at a telephoto extremity.

Second Embodiment:

FIG. 5 shows a lens arrangement of a two-group zoom lens at a wide-angle extremity, according to a second embodiment of the present invention. Numerical data of the lens system shown in FIG. 5 is shown in Table 2 below. Diagrams of various aberrations thereof at the shortest focal length, intermediate focal length, and longest focal length extremity are shown in FIGS. 6, 7 and 8, respectively.

TABLE 2

$F_{NO} = 1:4.2–4.9–5.9$
$f = 36.03–50.00–68.00$
$\omega = 32.2°–23.4°–17.4°$
$F_B = 42.34–51.32–62.89$
$f_1 = -54.828$
$f_2 = 35.259$
$f_w = 36.03$

| Surface No. | r | d | N | ν |
|---|---|---|---|---|
| 1 | 36.069 | 2.00 | 1.79500 | 45.3 |
| 2 | 17.554 | 6.46 | | |
| 3 | −71.175 | 1.60 | 1.80400 | 46.6 |
| 4 | −137.630 | 0.50 | | |
| 5 | 22.681 | 2.63 | 1.80518 | 25.4 |
| 6 | 29.260 | 28.63–13.65–3.41 (variable) | | |
| stop | | 1.21 | | |
| 7 | 42.968 | 1.21 | 1.71299 | 53.9 |
| 8 | −101.850 | 0.10 | | |
| 9 | 19.444 | 8.42 | 1.69680 | 56.5 |
| 10 | −22.971 | 1.50 | 1.83400 | 37.2 |
| 11 | 15.854 | 3.66 | | |
| 12 | −51.274 | 2.35 | 1.64328 | 47.9 |
| 13 | −23.543 | | | |

Figure 9:
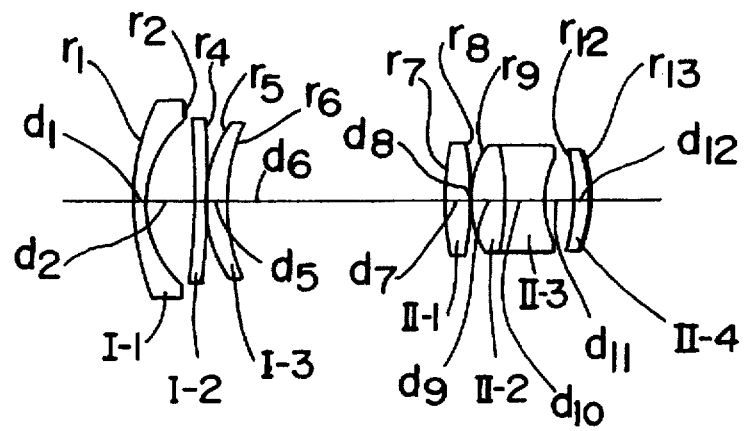
FIG. 9 is a schematic view of a lens arrangement of the two-group zoom lens at a wide-angle extremity, according to a third embodiment of the present invention.
Figure 10:
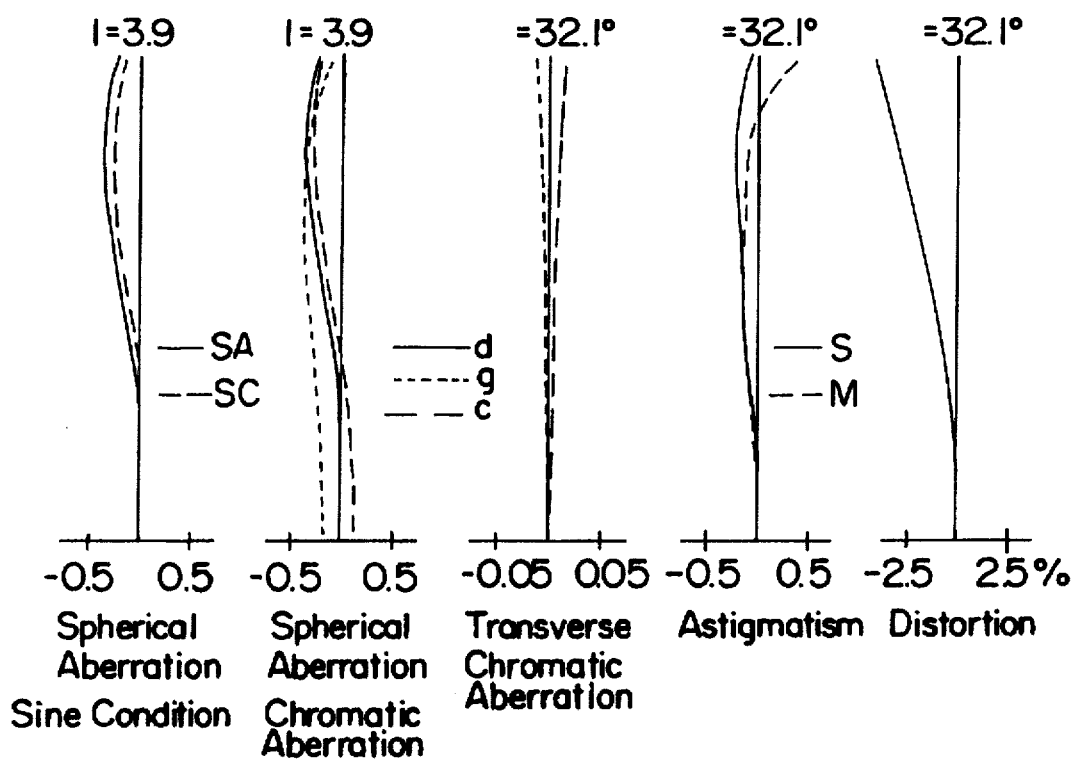
FIG. 10 shows various aberration diagrams of the two-group zoom lens, as shown in FIG. 9, at a wide-angle extremity.

Third Embodiment:

FIG. 9 shows a lens arrangement of a two-group zoom lens at a wide-angle extremity, according to a third embodiment of the present invention. Numerical data of the lens system shown in FIG. 9 is shown in Table 3 below. Diagrams of various aberrations thereof at the shortest focal length, intermediate focal length, and longest focal length extremity are shown in FIGS. 10, 11 and 12, respectively.

TABLE 3

$F_{NO} = 1:3.9–4.6–5.9$
$f = 35.96–50.00–75.00$
$\omega = 32.1°–23.4°–15.9°$
$F_B = 42.60–52.50–70.13$
$f_1 = -49.063$
$f_2 = 34.598$
$f_w = 35.96$

| Surface No. | r | d | N | ν |
|---|---|---|---|---|
| 1 | 39.540 | 1.65 | 1.77250 | 49.6 |
| 2 | 16.866 | 6.51 | | |
| 3 | −103.932 | 1.60 | 1.80610 | 40.9 |
| 4 | −518.960 | 0.10 | | |

TABLE 3-continued

| | | | | |
|---|---|---|---|---|
| 5 | 22.598 | 2.77 | 1.80518 | 25.4 |
| 6 | 31.345 | 27.99–14.73–3.42 (variable) | | |
| stop | | 1.20 | | |
| 7 | 47.904 | 3.21 | 1.69680 | 55.5 |
| 8 | −47.904 | 0.10 | | |
| 9 | 15.447 | 4.81 | 1.51633 | 64.1 |
| 10 | −43.109 | 5.61 | 1.83400 | 37.2 |
| 11 | 15.150 | 3.68 | | |
| 12 | −67.864 | 2.44 | 1.58267 | 46.4 |
| 13 | −25.449 | | | |

The values of the formulas (a), (b), (c) and (d) corresponding to the first, second and third embodiments, are shown in table 4 below.

TABLE 4

| | formulas (a) | formulas (b) | formulas (c) | formulas (d) |
|---|---|---|---|---|
| example 1 | 0.33022 | −1.252 | 0.825 | 0.890 |
| example 2 | 0.13720 | −0.651 | 0.828 | 0.400 |
| example 3 | 0.31767 | −1.246 | 0.817 | 0.095 |

As can be seen from Table 4 above, all three embodiments satisfy the requirements defined by the formulas (a), (b), (c) and (d). Moreover, according to the present invention, the aberrations are fully corrected throughout the entire focal length range from the wide-angle extremity to the telephoto extremity in a two-group zoom lens.

As may be understood from the above discussion, according to the present invention, a simple, compact and inexpensive two-group zoom lens of standard focal length range, having a magnification of around 2 includes fewer lenses, i.e., seven lenses. In general, to realize a compact zoom lens, it was necessary to increase the negative power of the negative lens or lenses of the second lens group, resulting in a deterioration of the quality of the zoom lens due to manufacturing error. However, in the present invention, lenses II-2 and II-3 having large powers are cemented to each other, the zoom lens is not influenced as significantly by manufacturing error. Hence, the zoom lenses can be inexpensively and stably mass-produced.

Furthermore, if the first lens group includes three individual lenses in a compact zoom lens having two lens groups, the distortion on the wide-angle side tends to be a large negative value. However, according to another aspect of the present invention, the second lens is made of a negative meniscus lens whose surface that is located nearer the image surface is convex. Hence, it is possible to eliminate the distortion while keeping the whole lens system compact.

I claim:

1. A zoom lens comprising a first lens group of negative power and a second lens group of positive power, located in this order from an object to be photographed, said first and second lens groups being moved relative to one another to provide various degrees of magnification, wherein;

said second lens group comprises a first lens of positive power, a second lens of positive power, a third lens of negative power, and a fourth lens of positive power, said second lens being cemented to said third lens;

wherein, distances between the lenses of said second lens group are maintained constant during a zooming operation of said zoom lens; and wherein said second and third lenses of said second lens group satisfy the following relationships:

$$0.1 < n_N - n_P < 0.4 \qquad (a)$$

$$-1.3 < r_c/f_2 < -0.5 \qquad (b)$$

$$0.6 < d_{1\text{-}2}/f_w < 1.2 \qquad (c)$$

wherein, $n_P$ represents a refractive index of said second lens, $n_N$ represents a refractive index of said third lens, $r_c$ represents a radius of curvature of a cementing surface of said second and third lenses, $f_2$ represents a focal length of said second lens group, $d_{1\text{-}2}$ represents a distance between a surface of a lens of said first lens group furthest the object to be photographed and a surface of said first lens of said second lens groups closest to the object, at a wide angle extremity, and $f_w$ represents a focal length of said zoom lens at the wide angle extremity.

2. A zoom lens of claim 1, wherein said first lens group is comprised of a first lens of negative power, a second lens of negative power, and a third lens of positive power.

3. A zoom lens comprising a first lens group of negative power and a second lens group of positive power, located in this order from an object to be photographed, said first and second lens groups being moved relative to one another to provide various degrees of magnification, said first lens group comprising a first meniscus lens of negative power having a convex surface on a side of said first meniscus lens nearer to the object, a second meniscus lens of negative power having a convex surface on a side of said second meniscus lens nearer to an object image surface, and a third meniscus lens of positive power having a convex surface on a side of said third meniscus lens nearer to the object;

wherein, distances between the lenses of said second lens group are maintained constant during zooming operation of said zoom lens; and wherein said zoom lens satisfies the following relationship:

$$0 < f_1/r_{2\text{-}2} < 1.2$$

wherein, $f_1$ represents a focal length of said first lens group, and $r_{2\text{-}2}$ represents a radius of curvature of a second lens surface of said second meniscus lens.

4. A zoom lens according to claim 1, wherein said zoom lens consists of said first lens group and said second lens group.

5. A zoom lens according to claim 3, wherein said zoom lens consists of said first lens group and said second lens group.

6. A zoom lens consisting of:

a first lens group of negative power, and a second lens group of positive power, located in this order from an object to be photographed, said first and second lens groups being moved relative to one another to change magnification;

said second lens group comprising a first lens of positive power, a second lens of positive power, a third lens of negative power, and a fourth lens of positive power, said second lens being cemented to said third lens; and wherein said second and third lenses satisfy the relationships:

$$0.1 < n_N - n_P < 0.4$$

$$-1.3 < r_c/f_2 < -0.5$$

$$0.6 < d_{1\text{-}2}/f_w < 1.2$$

wherein, $n_P$ represents a refractive index of said second lens, $n_N$ represents a refractive index of said third lens, $r_c$ represents a radius of curvature of a cementing surface of said second and third lenses, $f_2$ represents a focal length of said second lens group, $d_{1\text{-}2}$ represents a distance between a surface of a lens of said first lens group and a surface of a lens of said second lens group closest to the object, and $f_w$ represents a focal length of said zoom lens at a wide angle extremity.

7. The zoom lens according to claim 6, said first lens group comprising a first lens of negative power, a second lens of negative power and a third lens of positive power.

8. A zoom lens consisting of a first lens group of negative power and a second lens group of positive power, located in this order from an object to be photographed, said first and second lens groups being moved relative to one another to change magnification, wherein;

said first lens group comprising a first meniscus lens of negative power having a convex surface on a side of said first meniscus lens nearer to the object, a second meniscus lens of negative power having a convex surface on a side of said second meniscus lens nearer an object image surface, and a third meniscus lens of positive power having a convex surface on a side of said third meniscus lens nearer to the object; and wherein said zoom lens satisfies a following relationship:

$$0 < f_1/r_{2\text{-}2} 1.2$$

wherein, $f_1$ represents a focal length of said first lens group, and $r_{2\text{-}2}$ represents a radius of curvature of a second lens surface of said second meniscus lens.

* * * * *

UNITED STATES PATENT AND TRADEMARK OFFICE
CERTIFICATE OF CORRECTION

PATENT NO. : 5,546,232
DATED : August 13, 1996
INVENTOR(S) : Jun HIRAKAWA

It is certified that error appears in the above-indentified patent and that said Letters Patent is hereby corrected as shown below:

At column 8, line 50 (claim 8, line 15), change "$0<f_1/r_{2-2}1.2$" to ---$0<f_1/r_{2-2}<1.2$---.

Signed and Sealed this

Twenty-fifth Day of March, 199

Attest:

BRUCE LEHMAN

Attesting Officer    Commissioner of Patents and Trademarks